US012562662B2

(12) United States Patent
Cao et al.

(10) Patent No.: US 12,562,662 B2
(45) Date of Patent: Feb. 24, 2026

(54) NONLINEAR PREDICTIVE POSITION CONTROL METHOD SUITABLE FOR BIAXIAL PERMANENT MAGNET SERVO SYSTEM

(71) Applicants: ZHEJIANG UNIVERSITY ADVANCED ELECTRICAL EQUIPMENT INNOVATION CENTER, Zhejiang (CN); ZHEJIANG UNIVERSITY, Zhejiang (CN)

(72) Inventors: Yanfei Cao, Zhejiang (CN); Chen Li, Zhejiang (CN); Zhanqing Zhou, Zhejiang (CN); Qiang Geng, Zhejiang (CN); Tingna Shi, Zhejiang (CN); Changliang Xia, Zhejiang (CN)

(73) Assignees: ZHEJIANG UNIVERSITY ADVANCED ELECTRICAL EQUIPMENT INNOVATION CENTER, Zhejiang (CN); ZHEJIANG UNIVERSITY, Zhejiang (CN)

( * ) Notice: Subject to any disclaimer, the term of this patent is extended or adjusted under 35 U.S.C. 154(b) by 94 days.

(21) Appl. No.: 18/573,413

(22) PCT Filed: Jun. 7, 2023

(86) PCT No.: PCT/CN2023/098959
§ 371 (c)(1),
(2) Date: Dec. 21, 2023

(87) PCT Pub. No.: WO2023/237018
PCT Pub. Date: Dec. 14, 2023

(65) Prior Publication Data
US 2024/0291409 A1 Aug. 29, 2024

(30) Foreign Application Priority Data
Jun. 8, 2022 (CN) .......................... 202210646493.0

(51) Int. Cl.
$H02P\ 21/00$ (2016.01)
$H02P\ 21/13$ (2006.01)
(Continued)

(52) U.S. Cl.
CPC .......... $H02P\ 21/0017$ (2013.01); $H02P\ 21/13$ (2013.01); $H02P\ 21/18$ (2016.02); $H02P\ 21/22$ (2016.02); $H02P\ 25/03$ (2016.02)

(58) Field of Classification Search
CPC ...... H02P 21/0017; H02P 21/13; H02P 21/18; H02P 21/22; H02P 25/03; H02P 21/14; H02P 25/022; H02P 2207/05; Y02P 70/10
(Continued)

(56) References Cited

U.S. PATENT DOCUMENTS 4,617,637 A * 10/1986 Chu ...................... G05B 19/231
700/282
4,912,753 A * 3/1990 Evans, Jr. .............. G05B 19/39
700/45
(Continued)

FOREIGN PATENT DOCUMENTS

| CN | 108322120 | 7/2018 |
| CN | 112994553 | 6/2021 |
| CN | 114865977 | 8/2022 |

OTHER PUBLICATIONS

"International Search Report (Form PCT/ISA/210) of PCT/CN2023/098959", mailed on Sep. 22, 2023, pp. 1-4.
(Continued)

*Primary Examiner* — David Luo
(74) *Attorney, Agent, or Firm* — JCIPRNET

(57) ABSTRACT
The disclosure discloses a nonlinear predicative position control method suitable for a biaxial permanent magnet servo system. In consideration of uncertainty disturbance of the biaxial permanent magnet synchronous motor driving
(Continued)

system, a value function for the biaxial permanent magnet synchronous motor driving system and a constraint condition of the value function are constructed, and the value function is solved to obtain a voltage control quantity of the permanent magnet synchronous motor, and the voltage control quantity of the permanent magnet synchronous motor is input into the stator voltage input end of the permanent magnet synchronous motor, thereby realizing the adjustment control of the nonlinear prediction position of the biaxial permanent magnet synchronous motor driving system.

5 Claims, 2 Drawing Sheets

(51) Int. Cl.
    *H02P 21/18*         (2016.01)
    *H02P 21/22*         (2016.01)
    *H02P 25/03*         (2016.01)

(58) Field of Classification Search
    USPC ............................... 318/400.02, 400.01, 700
    See application file for complete search history.

(56) References Cited

U.S. PATENT DOCUMENTS 10,819,264 B1 * 10/2020 Bojoi ...................... H02P 21/18
2020/0280276 A1   9/2020 Thyagarajan

OTHER PUBLICATIONS

"Written Opinion of the International Searching Authority (Form PCT/ISA/237) of PCT/CN2023/098959", mailed on Sep. 22, 2023, pp. 1-4.
Yuenan Zeng et al., "Nonlinear Active Disturbance Rejection Controller Design for Current Loop of PMSM Drive System and Its Stability Analysis", Transactions of China Electrotechnical Society, vol. 32, Sep. 2017, pp. 135-143.
Yao Wei et al., "Prediction Horizons Optimized Nonlinear Predictive Control for Permanent Magnet Synchronous Motor Position System", IEEE Transactions on Industrial Electronics, vol. 67, Nov. 2020, pp. 9153-9163.
Rachid Errouissi et al., "Robust Cascaded Nonlinear Predictive Control of a Permanent Magnet Synchronous Motor With Antiwindup Compensator", IEEE Transactions on Industrial Electronics, vol. 59, Aug. 2012, pp. 3078-3088.
Xiuyun Zhang et al., "Generalized Predictive Contour Control of the Biaxial Motion System", IEEE Transactions on Industrial Electronics, vol. 65, Nov. 2018, pp. 8488-8497.
Tingna Shi et al., "Precise Contour Control of Biaxial Motion System Based on MPC", IEEE Journal of Emerging and Selected Topics in Power Electronics, vol. 6, Dec. 2018, pp. 1711-1721.

* cited by examiner

1

NONLINEAR PREDICTIVE POSITION CONTROL METHOD SUITABLE FOR BIAXIAL PERMANENT MAGNET SERVO SYSTEM

CROSS-REFERENCE TO RELATED APPLICATION

This application is a 371 of international application of PCT application serial no. PCT/CN2023/098959, filed on Jun. 7, 2023, which claims the priority benefit of China application no. 202210646493.0, filed on Jun. 8, 2022. The entirety of each of the above mentioned patent applications is hereby incorporated by reference herein and made a part of this specification.

BACKGROUND

Technical Field

The present disclosure relates to a control method of a permanent magnet synchronous motor, and in particular, to a nonlinear predictive position control method suitable for a biaxial permanent magnet synchronous motor.

Description of Related Art

A permanent magnet synchronous motor is favorable because of its advantages of simple structure, high power density, and wide speed range, and is commonly adopted in precision machining of CNC machine tools, semiconductor micromachining, robots and other applications. However, in the actual working process, because of the turning of the reference contour trajectory, the unbalanced load of the biaxial drive motor and other factors, the performance of the biaxial permanent magnet synchronous motor driving system deteriorates and the contour tracking accuracy is decreased. Therefore, it is of great significance to study the permanent magnet synchronous motor position tracking control strategy to achieve efficient and stable operation of the biaxial permanent magnet synchronous motor driving system.

In recent years, domestic and foreign scholars have conducted in-depth research on biaxial contour control methods. Specifically, the model predictive control method is commonly adopted in multi-motor control systems due to its advantages such as fast dynamic response speed. In Literature [1], based on generalized model predictive control, the permanent magnet synchronous motor tracking error is set as a control target and added to the value function and solved to obtain a single-axis drive motor cascade generalized predictive controller to drive motors of various axes, and combined with cross-coupling control decoupling to realize the contour tracking control of the biaxial permanent magnet synchronous motor driving system. In Literature [2], in combination with the model predictive control method, the tracking error and contour error are set as control targets and introduced into the value function simultaneously to solve the control law based on the optimal control theory, thereby determining the controller structure of the system, and realizing the drive control of the biaxial motor. However, the conventional model predictive control methods mostly employ a cascade controller structure to control the biaxial drive motor. The conventional controller structure is relatively redundant and has limited dynamic response performance.

2

SUMMARY

The technical problem to be solved by the present disclosure is to provide a nonlinear predictive position control method that is able to improve the dynamic response capability of a biaxial drive motor and improve the contour tracking accuracy of a biaxial permanent magnet synchronous motor driving system. The disclosure has a simple structure, fast dynamic response and high position tracking accuracy, and is of great significance for improving the biaxial contour tracking accuracy.

The technical solution adopted by the present disclosure is as follows.

In consideration of uncertainty disturbance of the biaxial permanent magnet synchronous motor driving system, a value function for the biaxial permanent magnet synchronous motor driving system and a constraint condition of the value function are constructed, and the value function is solved to obtain a voltage control quantity of the permanent magnet synchronous motor. The voltage control quantity of the permanent magnet synchronous motor is input into the stator voltage input end of the permanent magnet synchronous motor, thereby realizing the adjustment control of the nonlinear predicative position of the biaxial permanent magnet synchronous motor driving system.

The value function for the biaxial permanent magnet synchronous motor driving system is constructed as follows.

$$J = \frac{1}{2}\int_0^{T_1} \left(Y_1^{ref} - Y_1\right)^T H_1^T H_1 \left(Y_1^{ref} - Y_1\right) d\tau +$$

$$\frac{1}{2}\int_0^{T_2} \left(Y_2^{ref} - Y_2\right)^T H_2^T H_2 \left(Y_2^{ref} - Y_2\right) d\tau$$

$$H_1 = [\,1 \quad \tau\,], H_2 = \left[1 \quad \tau \quad \frac{\tau^2}{2!} \quad \frac{\tau^3}{3!}\right],$$

$$Y_1 = [\,y_1(t) \quad \dot{y}_1(t)\,]^T, Y_2 = [\,y_2(t) \quad \dot{y}_2(t) \quad \ddot{y}_2(t) \quad \dddot{y}_2(t)\,]^T$$

$$Y_1^{ref} = \left[\,y_1^{ref}(t) \quad \dot{y}_1(t)\,\right]^T; Y_2^{ref} = \left[\,y_2^{ref}(t) \quad \dot{y}_2(t) \quad \ddot{y}_2(t) \quad \dddot{y}_2(t)\,\right]^T$$

$$\begin{cases} y_1^{ref}(t) = i_{di}^*(t) \\ y_2^{ref}(t) = \theta_i^*(t) \\ y_1(t) = i_{di}(t) \\ y_2(t) = \theta_i(t) \end{cases}$$

in the formula, J is a value of the value function adopted by a predictive controller, $T_1$ and $T_2$ are the predicative step sizes of a current loop and a position loop of the permanent magnet synchronous motor respectively; $Y_1^{ref}$ and $Y_2^{ref}$ respectively represent a reference output vector of the value function, $H_1$ and $H_2$ respectively represent a weight coefficient matrix of the value function, $Y_1$ and $Y_2$ respectively represent an output evaluation vector of the value function, t represents a time, $\tau$ represents a future control time domain; $y_1(t)$ and $y_2(t)$ respectively represent a first component and a second component of an actual output vector of the control system at the time t; $\dot{y}_1(t)$ and $\dot{y}_2(t)$ respectively represent the first-order derivatives of the first component and the second component of the actual output vector of the control system at the time t; $\ddot{y}_2(t)$ represents the second-order derivative of the second component of the actual output vector of the control system at the time t; $y_1^{ref}(t)$ and $y_2^{ref}(t)$ respectively represent the first component and the second component of the reference output vector of the control system at the time t; $\dot{y}_2^{ref}(t)$ and $\dot{y}_2^{ref}(t)$ respectively represent the first-order derivatives of the first component and the second component of the reference output vector of the control system at the time t; $\ddot{y}_2^{ref}(t)$ and $\dddot{y}_2^{ref}(t)$ respectively represent the second-order derivative and the third-order derivative of the second component of the reference output vector of the control system at the time t; $i_{di}(t)$ and $i^*_{dr}(t)$ respectively represent the actual value and reference value of the d-axis current of the two permanent magnet synchronous motors at the time t, $\theta_i(t)$ and $\theta_i^*(t)$ respectively represent the actual value and reference value of the position angle of the two permanent magnet synchronous motors at the time t, i=1, 2 represents the reference sign of the two permanent magnet synchronous motors;

the above value function enables the permanent magnet synchronous motor system to track the given value as quickly as possible.

Under the described value function, nonlinear constraint conditions of the permanent magnet synchronous motor constructed for the biaxial system permanent magnet synchronous motor are further established:

$$\begin{cases} \dot{x}(t) = f(x(t)) + g_1(x(t))u(t) + g_2(x(t))b(t) \\ y(t) = h(x(t)) \end{cases}$$

$$f(x) = \begin{bmatrix} \dfrac{1}{L_s}(-R_s i_{di} + p\omega_i L_s i_{qi}) \\ \dfrac{1}{L_s}(-R_s i_{qi} + p\omega_i(\psi_f + L_s i_{di})) \\ \dfrac{1}{J_m}(1.5p\psi_f i_{qi} - B\omega_i) \\ \omega_i \end{bmatrix}$$

$$g_1(x) = \begin{bmatrix} \dfrac{1}{L_s} & 0 \\ 0 & \dfrac{1}{L_s} \\ 0 & 0 \\ 0 & 0 \end{bmatrix},$$

$$g_2(x) = \begin{bmatrix} 1 & 0 & 0 & 0 \\ 0 & 1 & 0 & 0 \\ 0 & 0 & 1 & 0 \\ 0 & 0 & 0 & 1 \end{bmatrix}$$

$$x(t) = [\, i_{di} \quad i_{qi} \quad \omega_i \quad \theta_i \,]^T$$

$$u(t) = [\, u_{di} \quad u_{qi} \,]^T$$

$$y(t) = [\, y_1 \quad y_2 \,]^T$$

$$b(t) = [\, b_{di} \quad b_{qi} \quad b_{\omega i} \quad b_{\theta i} \,]^T$$

in the formula, x(t) represents the state variable at time t, $\dot{x}(t)$ represents the first-order derivative of the state variable at time t, $i_{qi}$ represents the actual value of the q-axis current of the two permanent magnet synchronous motors, $\omega_i$ is the mechanical angular velocity of the two permanent magnet synchronous motors, u(t) represents the input vector of the motor control system at time t, $u_{di}$ and $u_{qi}$ respectively represent the voltage control quantities of the permanent magnet synchronous motor at d-axis and q-axis; $b_{di}$, $b_{qi}$, $b_{mi}$, and $b_{0i}$, respectively represent disturbance caused by d-axis parameter changes, q-axis parameter changes, external load changes and mechanical interference in the permanent magnet synchronous motor system; f(x) represents the nonlinear function of the motor control system, h(x (t)) represents the output function of the motor control system, b (t) represents the uncertainty disturbance vector at time t, $g_1$ (x) and $g_2$ (x) respectively represent the coefficient matrix functions of the input vector and disturbance vector; $R_s$, $L_s$, $\psi_f$, p, $J_m$, and B respectively represent the stator resistance, inductance, rotor permanent magnet flux, number of pole pairs, moment of inertia, and friction coefficient of the permanent magnet synchronous motor;

then, the voltage control quantity u(t) of the permanent magnet synchronous motor is obtained by minimizing an expression of the value function as the target, that is, taking $\partial J/\partial u=0$ as the target for solving.

The voltage control quantities $u_{di}$ and $u_{qi}$ in the voltage control quantity u(t) of the permanent magnet synchronous motor at d-axis and q-axis are input to the stator voltage input end of the permanent magnet synchronous motor, thereby realizing the adjustment control of the nonlinear predictive position of the biaxial permanent magnet synchronous motor driving system.

The uncertainty disturbance b(t) is obtained by establishing a processing of a nonlinear disturbance observer.

The nonlinear disturbance observer of the present disclosure may realize high-precision control of trajectory tracking of the biaxial permanent magnet synchronous motor driving system and perform real-time estimation of the uncertainty disturbance b (t) of the permanent magnet synchronous motor system.

The nonlinear disturbance observer is as follows.

$$\hat{b} = z + q(x(t))$$

$$\dot{z} = -Lz - L(f(x(t)) + g_1(x(t))u(t) + q(x(t)))$$

$$q(x(t)) = [\, l_1 i_{di} \quad l_2 i_{qi} \quad l_3 \omega_i \quad l_4 \theta_i \,]^T$$

$$\hat{b}(t) = [\, \hat{b}_{di} \quad \hat{b}_{qi} \quad \hat{b}_{\omega i} \quad \hat{b}_{\theta i} \,]^T$$

in the formula, $\hat{b}(t)$ represents the disturbance observation value; z and $\dot{z}$ respectively represent the state variable and a first-order derivative thereof inside the nonlinear observer; q(x(t)) is the nonlinear function to be designed for the nonlinear observer; L is the gain matrix of the nonlinear observer; $l_1$, $l_2$, $l_3$, and $l_4$ respectively represent the first, second, third and fourth gain coefficients of the nonlinear observer, and the gain coefficients $l_1$, $l_2$, $l_3$, and $l_4>0$; $\hat{b}_{dr}$, $\hat{b}_{qr}$, $\hat{b}_{\omega i}$, and $\hat{b}_{\theta i}$ respectively represent the observed values of $b_{di}$, $b_{qi}$, $b_{\omega i}$, and $b_{0i}$;

the disturbance observation value $\hat{b}$ is obtained through processing by the nonlinear disturbance observer, and the disturbance observation value $\hat{b}$ is substituted into the value function as the uncertainty disturbance b(t).

The voltage control quantity u(t) of the permanent magnet synchronous motor obtained by solving through the method is specifically calculated as:

$$u(t) = -G(x(t))^{-1}\begin{bmatrix} \displaystyle\sum_{j=0}^{1} \delta_j^1 \left(L_f^j h_1(x(t)) - y_1^{ref}\right) + K_1 \hat{b}(t) \\ \displaystyle\sum_{j=0}^{3} \delta_j^3 \left(L_f^j h_2(x(t)) - y_2^{ref}\right) + K_2 \hat{b}(t) \end{bmatrix}$$

$$G(x(t)) = \begin{bmatrix} \dfrac{1}{L_s} & 0 \\ 0 & \dfrac{1.5p\psi_f}{J_m L_s} \end{bmatrix}, \begin{cases} \delta_0^1 = \dfrac{3}{2T_1}, \delta_1^1 = 1 \\ \delta_0^3 = \dfrac{21}{2T_2^3}, \delta_1^3 = \dfrac{42}{5T_2^2}, \delta_2^3 = \dfrac{7}{2T_2}, \delta_3^3 = 1 \end{cases}$$

$$K_1 = [1 \quad 0 \quad 0 \quad 0], K_2 = \begin{bmatrix} 0 & \dfrac{1.5p\psi_f}{J_m} & \dfrac{7}{2T_2} - \dfrac{B}{J_m} & \dfrac{42}{5T_2^2} \end{bmatrix}$$

in the formula, G(x(t)) represents the coefficient matrix related to the motor parameters in the voltage control quantity; $\delta_j{}^1$ and $\delta_j{}^3$ represent the coefficients related to the predicative step size in the voltage control quantity; $K_1$ and $K_2$ respectively represent the constant matrix in the voltage control quantity; represents the Lie derivative symbol.

The characteristics and advantageous effects of the present disclosure are as follows:

The method of the present disclosure applies the nonlinear predictive control algorithm to the position control of the permanent magnet synchronous motor of the biaxial system, and establishes the optimal control value function for the nonlinear predictive position control.

The present disclosure employs a nonlinear predictive control algorithm to construct a non-cascade controller of a single-axis motor, thus simplifying the conventional cascade controller structure. In the meantime, the present disclosure employs optimization principles to solve the nonlinear predictive value function, so it is possible to effectively reduce the calculation amount of system and improve the dynamic response performance of system. In this way, the contour tracking accuracy of the biaxial permanent magnet synchronous motor driving system may be improved.

By constructing the nonlinear disturbance observer to estimate the uncertainty disturbance of the system, the influence of the parameter uncertainty disturbance on the position tracking of the motor of the biaxial system may be effectively suppressed.

DESCRIPTION OF THE EMBODIMENTS

The present disclosure will be described in detail below with reference to the embodiments and drawings. The described specific embodiments only illustrate the present disclosure and are not intended to limit the present disclosure.

In view of the problems of slow dynamic response and significant contour error in the conventional biaxial contour control structure, the present disclosure constructs a cascaded single-loop nonlinear predictive position controller based on a nonlinear predictive control algorithm, thereby improving the dynamic response performance of the system. In the meantime, a nonlinear disturbance observer is constructed to observe uncertainty disturbances such as system parameter mismatch and load mutation to suppress the influence caused by system uncertainty disturbances. In addition, in order to coordinately control the two axes, a position correction loop is incorporated to realize compensation for the given position of the biaxial drive motor.

Figure 1:
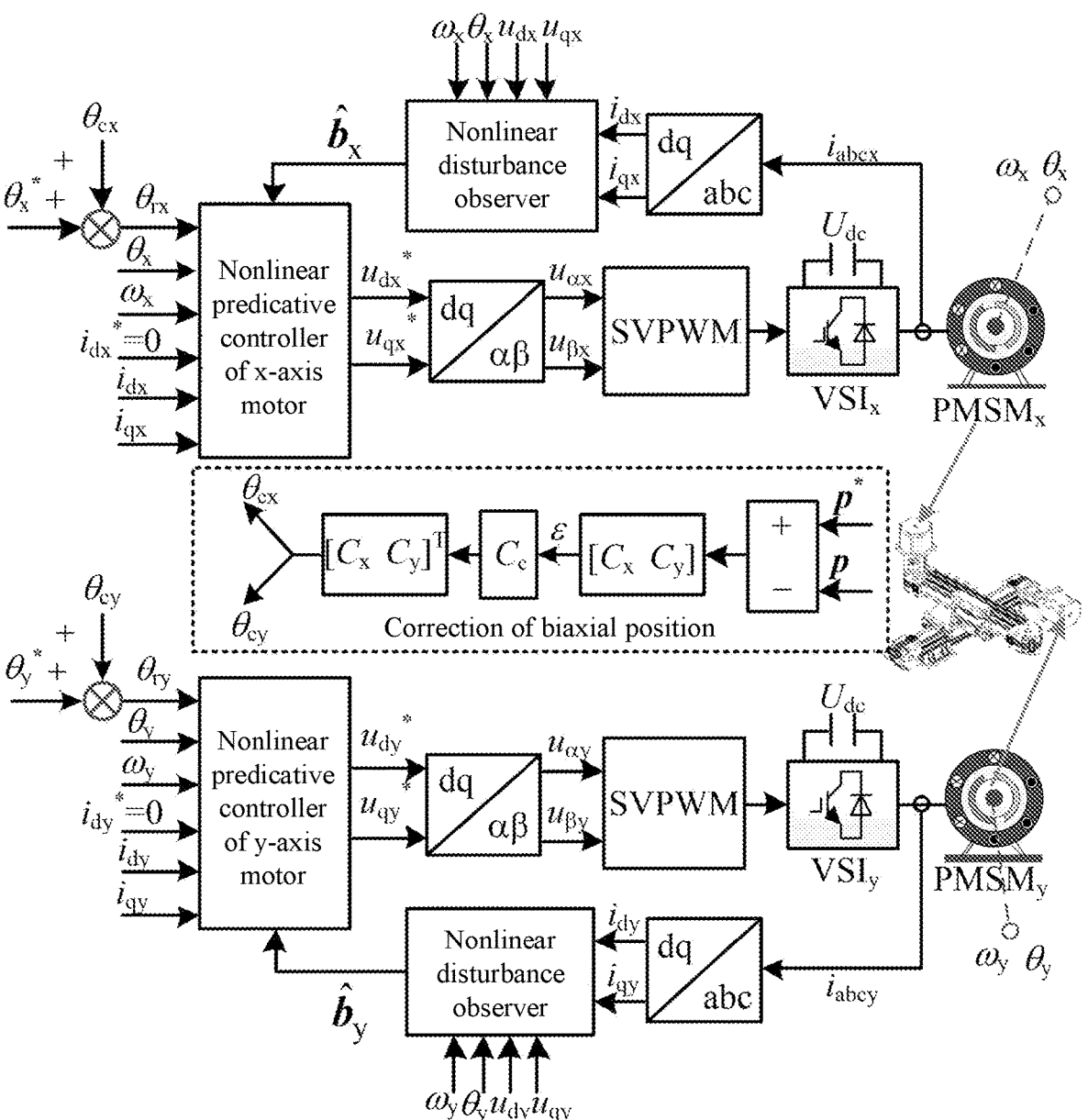
FIG. 1 is a schematic diagram illustrating the principle of an embodiment of a control system under the method of the present disclosure.

The specific implementation of the present disclosure is as follows:

FIG. 1 is a system block diagram illustrating application of the nonlinear predictive position control method of the biaxial permanent magnet synchronous motor driving system of the present disclosure. In the figure, $\theta_x{}^*$ and $\theta_y{}^*$ are the given values of the rotor positions of the x-axis and y-axis motors respectively, $\theta_x$ and $\theta_y$ are the actual values of the rotor positions of the x-axis and y-axis motors respectively, $\omega_x$ and $\omega_y$ are the mechanical angular speeds of the x-axis and y-axis motors respectively, $i_{dx}{}^*$ and $i_{dy}{}^*$ are the given d-axis currents of the x-axis and y-axis motors respectively, $i_{dx}$ and $i_{dy}$ are the actual values of d-axis currents of the x-axis and y-axis motors respectively, $i_{qx}$ and $i_{qy}$ are the actual values of q-axis currents of the x-axis and y-axis motors respectively, $\hat{b}_x$ and $\hat{b}_y$ are the disturbance observation values of the x-axis and y-axis motors respectively, $\theta_{cx}$ and $\theta_{cy}$ are the corrections of given position output by the cross-coupling control structure; p* and p are the given position and actual position matrix of the biaxial system respectively; $C_x$ and $C_y$ are the contour error compensation coefficients of various axes; $C_c$ is the gain coefficient of the cross-coupling controller; $\varepsilon$ is the biaxial contour error.

The following value function for the biaxial permanent magnet synchronous motor driving system is constructed as:

$$J = \frac{1}{2}\int_0^{T_1}\left(Y_1^{ref} - Y_1\right)^T H_1^T H_1\left(Y_1^{ref} - Y_1\right)d\tau +$$

$$\frac{1}{2}\int_0^{T_2}\left(Y_2^{ref} - Y_2\right)^T H_2^T H_2\left(Y_2^{ref} - Y_2\right)d\tau$$

$$H_1 = [\,1 \quad \tau\,],\, H_2 = \left[1 \quad \tau \quad \frac{\tau^2}{2!} \quad \frac{\tau^3}{3!}\right],$$

$$Y_1 = [\,y_1(t) \quad \dot{y}_1(t)\,]^T,\, Y_2 = \left[\,y_2(t) \quad \dot{y}_2(t) \quad \ddot{y}_2(t) \quad \dddot{y}_2(t)\,\right]^T$$

$$Y_1^{ref} = \left[\,y_1^{ref}(t) \quad \dot{y}_1(t)\,\right]^T;\, Y_2^{ref} = \left[\,y_2^{ref}(t) \quad \dot{y}_2(t) \quad \ddot{y}_2(t) \quad \dddot{y}_2(t)\,\right]^T$$

$$\begin{cases} y_1^{ref}(t) = i_{di}^*(t) \\ y_2^{ref}(t) = \theta_i^*(t) \\ y_1(t) = i_{di}(t) \\ y_2(t) = \theta_i(t) \end{cases}$$

Under the described value function, nonlinear constraint conditions of the permanent magnet synchronous motor constructed for the biaxial system permanent magnet synchronous motor are further established:

$$\begin{cases} \dot{x}(t) = f(x(t)) + g_1(x(t))u(t) + g_2(x(t))b(t) \\ y(t) = h(x(t)) \end{cases}$$

$$f(x) = \begin{bmatrix} \dfrac{1}{L_s}(-R_s i_{di} + p\omega_i L_s i_{qi}) \\ \dfrac{1}{L_s}(-R_s i_{qi} + p\omega_i(\psi_f + L_s i_{di})) \\ \dfrac{1}{J_m}(1.5p\psi_f i_{qi} - B\omega_i) \\ \omega_i \end{bmatrix}$$

$$g_1(x) = \begin{bmatrix} \dfrac{1}{L_s} & 0 \\ 0 & \dfrac{1}{L_s} \\ 0 & 0 \\ 0 & 0 \end{bmatrix},$$

$$g_2(x) = \begin{bmatrix} 1 & 0 & 0 & 0 \\ 0 & 1 & 0 & 0 \\ 0 & 0 & 1 & 0 \\ 0 & 0 & 0 & 1 \end{bmatrix}$$

$$x(t) = [\,i_{di} \quad i_{qi} \quad \omega_i \quad \theta_i\,]^T$$

$$u(t) = [\,u_{di} \quad u_{qi}\,]^T$$

$$y(t) = [\,y_1 \quad y_2\,]^T$$

$$b(t) = [\,b_{di} \quad b_{qi} \quad b_{\omega i} \quad b_{\theta i}\,]^T$$

The uncertainty disturbance b(t) is obtained by establishing a processing of a nonlinear disturbance observer. The nonlinear disturbance observer is as follows:

$$\hat{b} = z + q(x(t))$$

$$\dot{x} = -Lz - L(f(x(t)) + g_1(x(t))u(t) + q(x(t)))$$

$$q(x(t)) = [\, l_1 i_{di} \quad l_2 i_{qi} \quad l_3 \omega_i \quad l_4 \theta_i \,]^T$$

$$\hat{b}(t) = [\, \hat{b}_{di} \quad \hat{b}_{qi} \quad \hat{b}_{\omega i} \quad \hat{b}_{\theta i} \,]^T$$

The disturbance observation value $\hat{b}$ is obtained through processing by the above nonlinear disturbance observer, and the disturbance observation value $\hat{b}$ is substituted into the value function as the uncertainty disturbance b(t).

Then, the voltage control quantity u(t) of the permanent magnet synchronous motor is obtained by minimizing an expression of the value function as the target, that is, taking $\partial J/\partial u=0$ as the target for solving.

The voltage control quantity u(t) of the permanent magnet synchronous motor obtained from the final solution is specifically calculated as:

$$u(t) = -G(x(t))^{-1} \begin{bmatrix} \sum_{j=0}^{1} \delta_j^1 \left( L_f^j h_1(x(t)) - y_1^{ref} \right) + K_1 \hat{b}(t) \\ \sum_{j=0}^{3} \delta_j^3 \left( L_f^j h_2(x(t)) - y_2^{ref} \right) + K_2 \hat{b}(t) \end{bmatrix}$$

$$G(x(t)) = \begin{bmatrix} \dfrac{1}{L_s} & 0 \\ 0 & \dfrac{1.5 p \psi_f}{J_m L_s} \end{bmatrix}, \begin{cases} \delta_0^1 = \dfrac{3}{2T_1}, \delta_1^1 = 1 \\ \delta_0^3 = \dfrac{21}{2T_2^3}, \delta_1^3 = \dfrac{42}{5T_2^2}, \delta_2^3 = \dfrac{7}{2T_2}, \delta_3^3 = 1 \end{cases}$$

$$K_1 = [\, 1 \quad 0 \quad 0 \quad 0 \,], K_2 = \begin{bmatrix} 0 & \dfrac{1.5 p \psi_f}{J_m} & \dfrac{7}{2T_2} - \dfrac{B}{J_m} & \dfrac{42}{5T_2^2} \end{bmatrix}$$

The voltage control quantities $u_{di}$ and $u_{qi}$ in the voltage control quantity u(t) of the permanent magnet synchronous motor at d-axis and q-axis are input to the stator voltage input end of the permanent magnet synchronous motor, thereby realizing the adjustment control of the nonlinear predictive position of the biaxial permanent magnet synchronous motor driving system.

Figure 2:
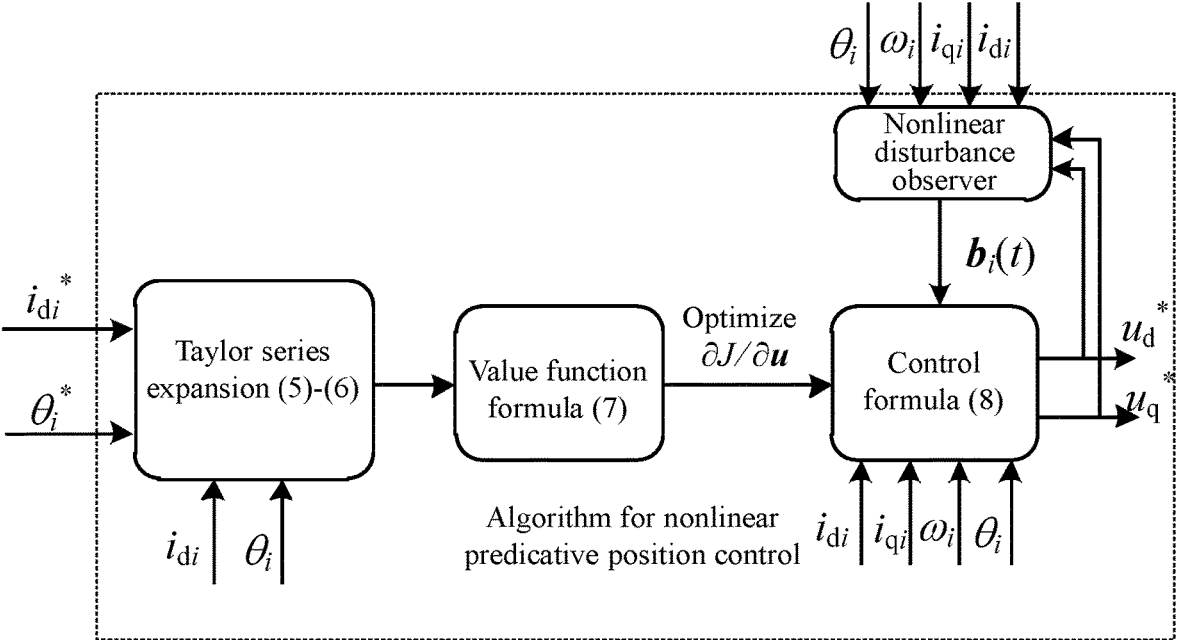
FIG. 2 is a schematic diagram illustrating the principle of an algorithm for nonlinear predictive control of a single-axis motor.

FIG. 2 is a schematic diagram illustrating the principle of an algorithm of a nonlinear predicative position of a single-axis motor. In the specific implementation process of nonlinear predictive position control, a control method of a given value of d-axis current $i_d{}^*=0$ of the permanent magnet synchronous motor is adopted. Moreover, the position angle $\theta_i{}^*$ of mechanical rotor of motor of each axis corresponding to the given contour trajectory of the biaxial permanent magnet synchronous motor driving system is used as the given input of the nonlinear predictive position controller, and combined with the nonlinear disturbance observer to realize control of the permanent magnet synchronous motor of each axis.

The present disclosure has been described above in conjunction with the drawings. However, the present disclosure is not limited to the above-mentioned specific embodiments. The above-mentioned specific embodiments are only illustrative and not restrictive. Under the inspiration of the present disclosure, those of ordinary skill in the art can make many modifications without departing from the principle of the present disclosure, and the modifications are all within the scope to be protected by the present disclosure.

What is claimed is:

1. A nonlinear predictive position control method suitable for a biaxial permanent magnet servo system, wherein the method comprises: the biaxial permanent magnet servo system is a biaxial permanent magnet synchronous motor driving system, in consideration of an uncertainty disturbance of the biaxial permanent magnet synchronous motor driving system, a value function for the biaxial permanent magnet synchronous motor driving system and a constraint condition of the value function are constructed, and the value function is solved to obtain a voltage control quantity of a permanent magnet synchronous motor, the voltage control quantity of the permanent magnet synchronous motor is input into a stator voltage input end of the permanent magnet synchronous motor, thereby realizing an adjustment control of a nonlinear predicative position of the biaxial permanent magnet synchronous motor driving system, wherein the value function for the biaxial permanent magnet synchronous motor driving system is constructed as follows:

$$J = \frac{1}{2}\int_0^{T_1} \left( Y_1^{ref} - Y_1 \right)^T H_1^T H_1 \left( Y_1^{ref} - Y_1 \right) d\tau +$$

$$\frac{1}{2}\int_0^{T_2} \left( Y_2^{ref} - Y_2 \right)^T H_2^T H_2 \left( Y_2^{ref} - Y_2 \right) d\tau$$

$$H_1 = [\, 1 \quad \tau \,], H_2 = \begin{bmatrix} 1 & \tau & \dfrac{\tau^2}{2!} & \dfrac{\tau^3}{3!} \end{bmatrix},$$

$$Y_1 = [\, y_1(t) \quad \dot{y}_1(t) \,]^T, Y_2 = [\, y_2(t) \quad \dot{y}_2(t) \quad \ddot{y}_2(t) \quad \dddot{y}_2(t) \,]^T$$

$$Y_1^{ref} = [\, y_1^{ref}(t) \quad \dot{y}_1^{ref}(t) \,]^T; Y_2^{ref} = [\, y_2^{ref}(t) \quad \dot{y}_2^{ref}(t) \quad \ddot{y}_2^{ref}(t) \quad \dddot{y}_2^{ref}(t) \,]^T$$

$$\begin{cases} y_1^{ref}(t) = i_{di}^*(t) \\ y_2^{ref}(t) = \theta_i^*(t) \\ y_1(t) = i_{di}(t) \\ y_2(t) = \theta_i(t) \end{cases}$$

wherein J is a value of the value function, $T_1$ and $T_2$ are predicative step sizes of a current loop and a position loop of the permanent magnet synchronous motor respectively; $Y_1^{ref}$ and $Y_2^{ref}$ respectively represent a reference output vector of the value function, $H_1$ and $H_2$ respectively represent a weight coefficient matrix of the value function, $Y_1$ and $Y_2$ respectively represent an output evaluation vector of the value function, t represents a time, t represents a future control time domain; $y_1(t)$ and $y_2(t)$ respectively represent a first component and a second component of an actual output vector of a control system at the time t; $\dot{y}_1(t)$ and $\dot{y}_2(t)$ respectively represent first-order derivatives of the first component and the second component of the actual output vector of the control system at the time t; $\ddot{y}_2(t)$ represents a second-order derivative of the second component of the actual output vector of the control system at the time t; $y_1^{ref}(t)$ and $y_2^{ref}(t)$ respectively represent a first component and a second component of a reference output vector of the control system at time the t; $\dot{y}_1^{ref}(t)$ and $\dot{y}_2^{ref}(t)$ respectively represent first-order derivatives of the first component and the second component of the reference output vector of the control system at the time t; $\ddot{y}_2^{ref}(t)$ and $\dddot{y}_2^{ref}(t)$ respectively represent a second-order derivative and a third-order derivative of the second component of the reference output vector of the control system at the time t; $i_{di}(t)$ and $i_{di}*(t)$ respectively represent an actual value and a reference value of a d-axis current of the two permanent magnet synchronous motors at the time t, $\theta_i$ (t) and $\theta_i*(t)$ respectively represent an actual value and a reference value of a position angle of the two permanent magnet synchronous motors at the time t, i=1,2 represents a reference sign of the two permanent magnet synchronous motors; under the value function, nonlinear constraint conditions of the permanent magnet synchronous motor are further established:

$$\begin{cases} \dot{x}(t) = f(x(t)) + g_1(x(t))u(t) + g_2(x(t))b(t) \\ y(t) = h(x(t)) \end{cases}$$

$$f(x) = \begin{bmatrix} \dfrac{1}{L_s}(-R_s i_{di} + p\omega_i L_s i_{qi}) \\ \dfrac{1}{L_s}(-R_s i_{qi} + p\omega_i(\psi_f + L_s i_{di})) \\ \dfrac{1}{J_m}(1.5 p\psi_f i_{qi} - B\omega_i) \\ \omega_i \end{bmatrix}$$

$$g_1(x) = \begin{bmatrix} \dfrac{1}{L_s} & 0 \\ 0 & \dfrac{1}{L_s} \\ 0 & 0 \\ 0 & 0 \end{bmatrix}, \; g_2(x) = \begin{bmatrix} 1 & 0 & 0 & 0 \\ 0 & 1 & 0 & 0 \\ 0 & 0 & 1 & 0 \\ 0 & 0 & 0 & 1 \end{bmatrix}$$

$$x(t) = [\, i_{di} \quad i_{qi} \quad \omega_i \quad \theta_i \,]^T$$

$$u(t) = [\, u_{di} \quad u_{qi} \,]^T$$

$$y(t) = [\, y_1 \quad y_2 \,]^T$$

$$b(t) = [\, b_{di} \quad b_{qi} \quad b_{\omega i} \quad b_{\theta i} \,]^T$$

wherein x(t) represents a state variable at the time t, $\dot{x}(t)$ represents a first-order derivative of the state variable at the time t, $i_{qi}$ represents an actual value of a q-axis current of the two permanent magnet synchronous motors, $\omega_i$ is a mechanical angular velocity of the two permanent magnet synchronous motors, u(t) represents an input vector of a motor control system at the time t, $u_{di}$ and $u_{qi}$ respectively represent voltage control quantities of the permanent magnet synchronous motor at d-axis and q-axis; $b_{di}$, $b_{qi}$, $b_{\omega i}$, and $b_{\theta i}$ respectively represent a disturbance caused by d-axis parameter changes, q-axis parameter changes, external load changes and a mechanical interference in the permanent magnet synchronous motor system; f(x) represents a nonlinear function of the motor control system, h(x(t)) represents an output function of the motor control system, b (t) represents an uncertainty disturbance vector at the time t, $g_1(x)$ and $g_2(x)$ respectively represent coefficient matrix functions of the input vector and the disturbance vector; $R_s$, $L_s$, $\psi_f$, p, $J_m$, and B respectively represent a stator resistance, an inductance, a rotor permanent magnet flux, number of pole pairs, a moment of inertia, and a friction coefficient of the permanent magnet synchronous motor;

then, the voltage control quantity u(t) of the permanent magnet synchronous motor is obtained by minimizing an expression of the value function as a target for solving.

2. The nonlinear predictive position control method suitable for the biaxial permanent magnet servo system according to claim 1, wherein the voltage control quantities $u_{di}$ and $u_{qi}$ in the voltage control quantity u(t) of the permanent magnet synchronous motor at the d-axis and the q-axis are input to the stator voltage input end of the permanent magnet synchronous motor, thereby realizing an adjustment control of the nonlinear predictive position of the biaxial permanent magnet synchronous motor driving system.

3. The nonlinear predictive position control method suitable for the biaxial permanent magnet servo system according to claim 1, wherein the uncertainty disturbance b(t) is obtained by establishing a processing of a nonlinear disturbance observer.

4. The nonlinear predictive position control method suitable for the biaxial permanent magnet servo system according to claim 3, wherein the nonlinear disturbance observer is as follows:

$$\hat{b} = z + q(x(t))/\dot{z} = -Lz - L(f(x(t)) + g_1(x(t))u(t) + q(x(t)))$$

$$\hat{b} = z + q(x(t))$$

$$\dot{z} = -Lz - L(f(x(t)) + g_1(x(t))u(t) + q(x(t)))$$

$$q(x(t)) = [\, l_1 i_{di} \quad l_2 i_{qi} \quad l_3 \omega_i \quad l_4 \theta_i \,]^T$$

$$\hat{b}(t) = [\, \hat{b}_{di} \quad \hat{b}_{qi} \quad \hat{b}_{\omega i} \quad \hat{b}_{\theta i} \,]^T$$

wherein $\hat{b}(t)$ represents a disturbance observation value; z and $\dot{z}$ respectively represent a state variable and a first-order derivative thereof inside a nonlinear observer; q( ) is a nonlinear function to be designed for the nonlinear observer; L is a gain matrix of the nonlinear observer; $l_1$, $l_2$, $l_3$, and $l_4$ respectively represent first, second, third and fourth gain coefficients of the nonlinear observer, and the gain coefficients $l_1$, $l_2$, $l_3$, and $l_4 > 0$; $\hat{b}_{di}$, $\hat{b}_{qi}$, $\hat{b}_{\omega i}$, and $\hat{b}_{\theta i}$ respectively represent observed values of $b_{di}$, $b_{qi}$, $b_{\omega i}$, and $b_{\theta i}$;

the disturbance observation value $\hat{b}$ is obtained through processing by the nonlinear disturbance observer, and the disturbance observation value $\hat{b}$ is substituted into the value function as the uncertainty disturbance b(t).

5. The nonlinear predictive position control method suitable for the biaxial permanent magnet servo system according to claim 1, wherein:

the voltage control quantity u(t) of the permanent magnet synchronous motor obtained by solving through the method is specifically calculated as:

$$u(t) = -G(x(t))^{-1} \begin{bmatrix} \sum_{j=0}^{1} \delta_j^1 (L_f^j h_1(x(t)) - y_1^{ref}) + K_1 \hat{b}(t) \\ \sum_{j=0}^{3} \delta_j^3 (L_f^j h_2(x(t)) - y_2^{ref}) + K_2 \hat{b}(t) \end{bmatrix}$$

$$G(x(t)) = \begin{bmatrix} \dfrac{1}{L_s} & 0 \\ 0 & \dfrac{1.5 p\psi_f}{J_m L_s} \end{bmatrix}, \; \begin{cases} \delta_0^1 = \dfrac{3}{2T_1}, \delta_1^1 = 1 \\ \delta_0^3 = \dfrac{21}{2T_2^3}, \delta_1^3 = \dfrac{42}{5T_2^2}, \delta_2^3 = \dfrac{7}{2T_2}, \delta_3^3 = 1 \end{cases}$$

$$K_1 = [1 \;\; 0 \;\; 0 \;\; 0], K_2 = \begin{bmatrix} 0 & \dfrac{1.5 p\psi_f}{J_m} & \dfrac{7}{2T_2} - \dfrac{B}{J_m} & \dfrac{42}{5T_2^2} \end{bmatrix}$$

wherein G(x(t)) represents a coefficient matrix related to motor parameters in the voltage control quantity; $\delta_j^1$ and $\delta_j^3$ represent coefficients related to a predicative step size in the voltage control quantity; $K_1$ and $K_2$ respectively represent a constant matrix in the voltage control quantity.

* * * * *